United States Patent
Blanchard et al.

(10) Patent No.: US 8,229,746 B2
(45) Date of Patent: *Jul. 24, 2012

(54) ENHANCED ACCURACY FOR SPEECH RECOGNITION GRAMMARS

(75) Inventors: Harry Blanchard, Rumson, NJ (US); Steven Lewis, Middletown, NJ (US); Shankarnarayan Sivaprasad, Highland Park, NJ (US); Lan Zhang, Freehold, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/026,884

(22) Filed: Feb. 14, 2011

(65) Prior Publication Data
US 2011/0137652 A1     Jun. 9, 2011

Related U.S. Application Data

(63) Continuation of application No. 11/470,685, filed on Sep. 7, 2006, now Pat. No. 7,890,328.

(51) Int. Cl.
*G10L 15/18* (2006.01)
*G10L 15/06* (2006.01)
*G10L 21/00* (2006.01)

(52) U.S. Cl. .......... 704/257; 704/244; 704/270
(58) Field of Classification Search .......... None
See application file for complete search history.

(56) References Cited

U.S. PATENT DOCUMENTS

| 6,501,833 | B2 | 12/2002 | Phillips et al. |
| 6,587,822 | B2 | 7/2003 | Brown et al. |
| 7,194,069 | B1 | 3/2007 | Jones et al. |
| 7,493,260 | B2 | 2/2009 | Harb et al. |
| 7,603,279 | B2 * | 10/2009 | Washio .......... 704/277 |
| 2008/0019496 | A1 | 1/2008 | Taschereau |

* cited by examiner

*Primary Examiner* — Brian Albertalli

(57) ABSTRACT

Disclosed herein are methods and systems for recognizing speech. A method embodiment comprises comparing received speech with a precompiled grammar based on a database and if the received speech matches data in the precompiled grammar then returning a result based on the matched data. If the received speech does not match data in the precompiled grammar, then dynamically compiling a new grammar based only on new data added to the database after the compiling of the precompiled grammar. The database may comprise a directory of names.

20 Claims, 2 Drawing Sheets

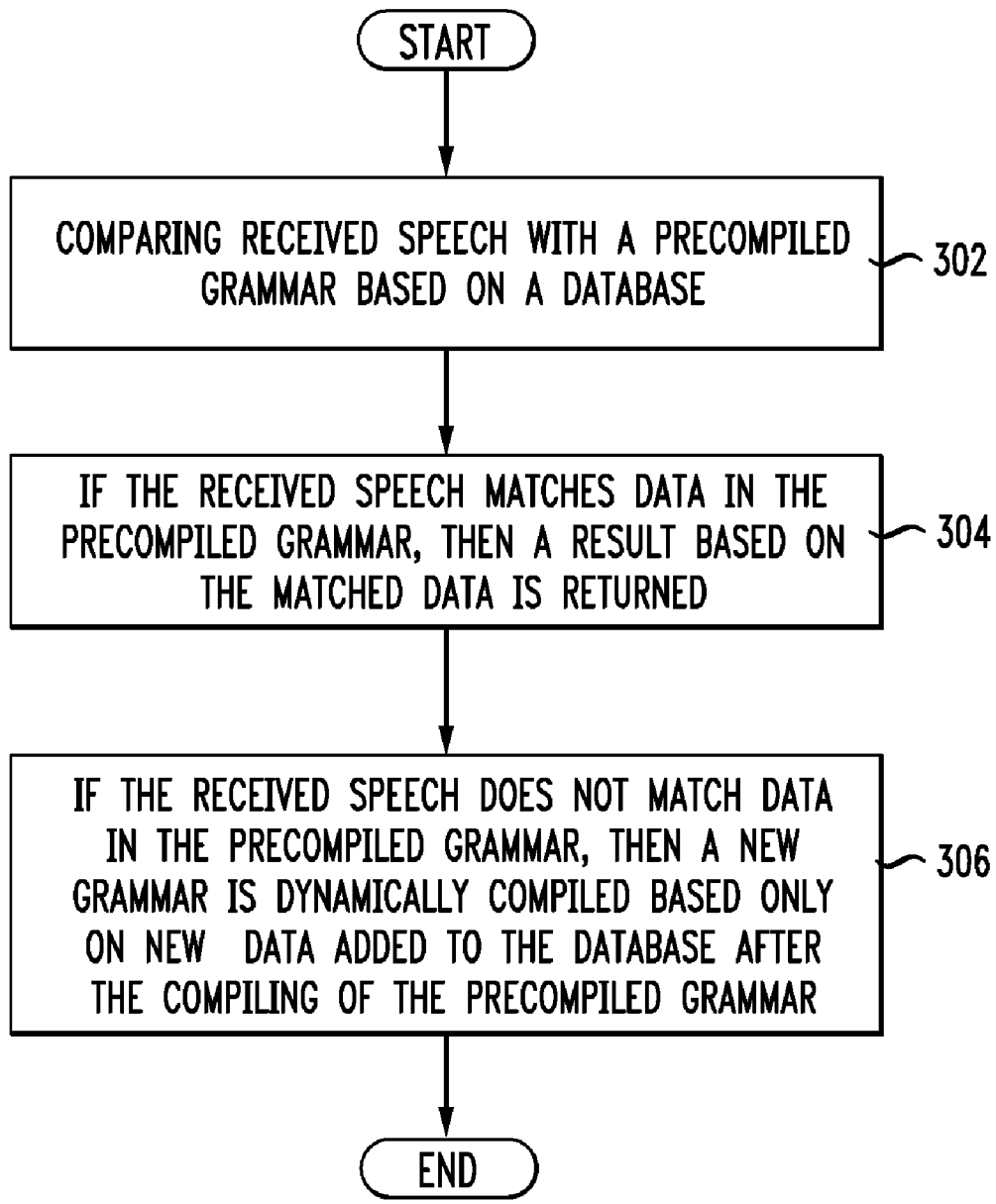

US 8,229,746 B2

ENHANCED ACCURACY FOR SPEECH RECOGNITION GRAMMARS

PRIORITY INFORMATION

The present application is a continuation of U.S. patent application Ser. No. 11/470,685, filed Sep. 7, 2006, the content of which is included herewith in its entirety.

BACKGROUND OF THE INVENTION

1. Field of the Invention

The present invention relates to a system and method of providing interactive response system and more specifically to a system and method of providing an improved method and system for performing speech recognition.

2. Introduction

Many entities utilize interactive voice systems to communicate with people. For example, there are many natural language dialog systems where a caller can call the system and hear a prompt such as "how may I help you?". The user can then talk to the computer which utilizes programming modules such as an automatic speech recognition module (ASR), a spoken language understanding module (SLU), a dialog management module (DM) and a text-to-speech module (TTS) or any other type of speech generation module to communicate. As these names indicate, each module will carry out respective functions such as transforming voice signals into text, determining the meaning of that text, generating a dialog response and converting text into audible speech or playing back recorded audio so that the user can hear the response. These basic components are known to those of skill in the art.

Building a dialog system is costly and takes highly trained technicians. Systems may be built utilizing one or more features of a spoken dialog system. For example, a large company may maintain a directory system accessible via automatic speech recognition. In this case the names in the database are precompiled into what is known by those of skill in the art as a recognition grammar. This increases the recognition success for the application by limiting the number of tokens or names that can be recognized by the grammar to those in the actual database, rather than using an extremely large set of all possible names.

But this precompiling process can be the source of difficulties. For example, the recognition grammar must be recompiled periodically due to changes in the names in the database. Names may be added or removed. Constantly updating and recompiling a large recognition grammar may be costly and time consuming.

Therefore, what is needed in the art is an improved way of providing speech recognition where the recognition grammar is associated with an underlying database that is constantly changing.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention provides for systems, methods and computer-readable media for recognizing speech. The method embodiment comprises comparing received speech with a precompiled grammar based on a database, if the received speech matches data in the precompiled database, then returning a result based on the matched data. If the received speech does not match data in the precompiled grammar, then dynamically compiling a new grammar based only on new data added to the database after the compiling of the precompiled grammar. The new data may be obtained from a source such as a table, a list or a database of updates to the database associated with the compiling of the precompiled data. In a preferred embodiment, the database is associated with a directory of names.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a method embodiment.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention. In particular, the invention is not limited to natural language interactive voice response systems but can be applied equally to systems that use simple speech recognition.

Figure 1:
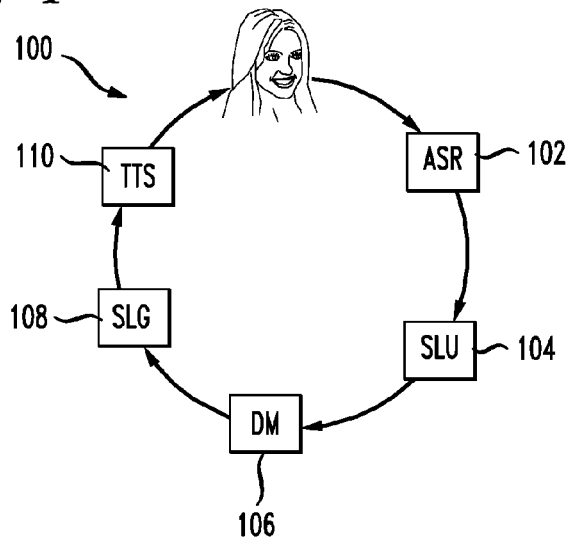
FIG. 1 illustrates a block diagram of a spoken dialog system.

As mentioned above, interactive voice response dialog systems aim to identify intents of humans and take actions accordingly, to satisfy their requests. The present invention may apply to a spoken dialog system, a natural dialog system or to a simple speech recognition system. The various components of a spoken dialog system are shown but not meant to limit the structure of the invention to a more complicated application than is necessary. FIG. 1 is a functional block diagram of an exemplary natural language spoken dialog system 100. Natural language spoken dialog system 100 may include an automatic speech recognition (ASR) module 102, a spoken language understanding (SLU) module 104, a dialog management (DM) module 106, a spoken language generation (SLG) module 108, and a text-to-speech (TTS) module 110. The present invention focuses on innovations related to how to manage the call-flow and how to make changes to the call-flow.

ASR module 102 may analyze speech input and may provide a transcription of the speech input as output SLU module 104 may receive the transcribed input and may use a natural language understanding model to analyze the group of words that are included in the transcribed input to derive a meaning from the input. The role of DM module 106 is to interact in a natural way and help the user to achieve the task that the system is designed to support. DM module 106 may receive the meaning of the speech input from SLU module 104 and may determine an action, such as, for example, providing a response, based on the input. SLG module 108 may generate a transcription of one or more words in response to the action provided by DM 106. TTS module 110 may receive the transcription as input and may provide generated audible speech as output based on the transcribed speech. Any other method of producing speech may be used as well, such as presenting pre-recorded speech, concatenating speech segments or any other know method.

Thus, the modules of system 100 may recognize speech input, such as speech utterances, may transcribe the speech input, may identify (or understand) the meaning of the transcribed speech, may determine an appropriate response to the speech input, may generate text of the appropriate response and from that text, may generate audible "speech" from system 100, which the user then hears. In this manner, the user can carry on a natural language dialog with system 100. Those of ordinary skill in the art will understand the programming languages and means for generating and training ASR module 102 or any of the other modules in the spoken dialog system. Further, the modules of system 100 may operate independent of a full dialog system. For example, a computing device such as a smartphone (or any processing device having a phone capability) may have an ASR module wherein a user may say "call mom" and the smartphone may act on the instruction without a "spoken dialog."

Figure 2:
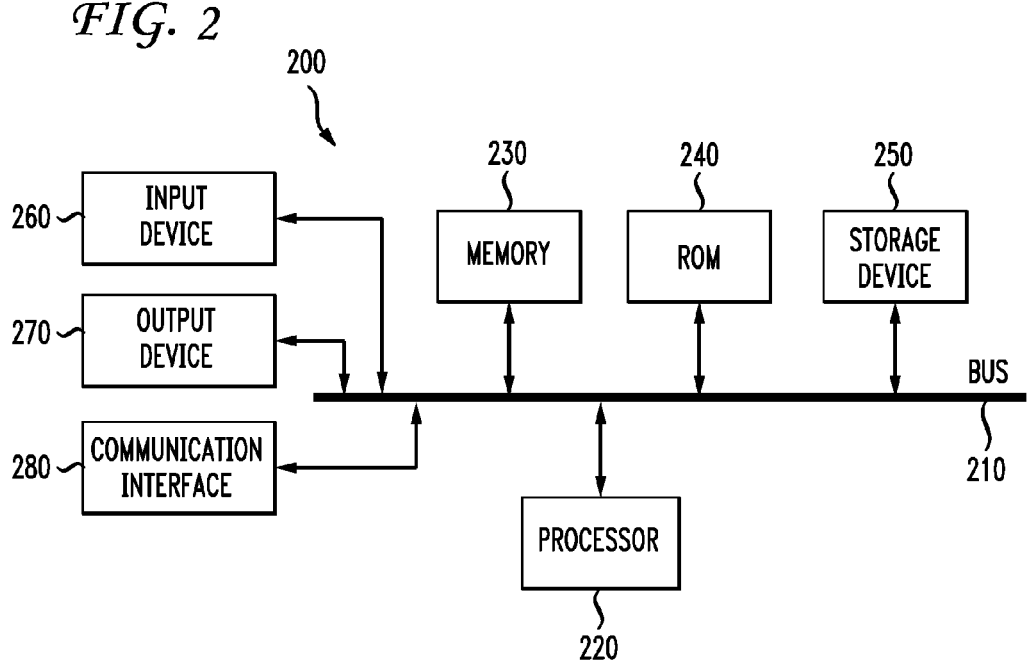
FIG. 2 illustrates basic components in a system embodiment.

FIG. 2 illustrates an exemplary processing system 200 in which one or more of the modules of system 100 may be implemented. Thus, system 100 may include at least one processing system, such as, for example, exemplary processing system 200. System 200 may include a bus 210, a processor 220, a memory 230, a read only memory (ROM) 240, a storage device 250, an input device 260, an output device 270, and a communication interface 280. Bus 210 may permit communication among the components of system 200. Where the inventions disclosed herein relate to the TTS voice, the output device may include a speaker that generates the audible sound representing the computer-synthesized speech.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive.

Input device 260 may include one or more conventional mechanisms that permit a user to input information to system 200, such as a keyboard, a mouse, a pen, motion input, a voice recognition device, a DTMF decoder, etc. Output device 270 may include one or more conventional mechanisms that output information to the user, including a display, a printer, one or more speakers, or a medium, such as a memory, or a magnetic or optical disk and a corresponding disk drive. Communication interface 280 may include any transceiver-like mechanism that enables system 200 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections. In some implementations of natural spoken dialog system 100, communication interface 280 may not be included in processing system 200 when natural spoken dialog system 100 is implemented completely within a single processing system 200.

System 200 may perform such functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

An embodiment of the invention relates to a method of recognizing speech. The method comprises comparing received speech with a precompiled grammar based on a database (302), and, if the received speech matches data in the precompiled grammar, then returning a result based on the matched data (304). If the received speech does not match data in the precompiled grammar then the method comprises dynamically compiling a new grammar based only on new data added to the database after the compiling of the precompiled grammar (306). The new data may be obtained from at least one of a table, a list or a database of updates to the database that was used to build the precompiled grammar. In a preferable embodiment the database comprises a directory of names. The step of determining whether the received speech data matches data in the precompiled grammar may further comprise determining whether the received speech data matches data in the precompiled grammar according to a given threshold.

The concept disclosed herein solves the problem of a large expense typically associated with regular updates to databases such as employee name grammars used in automatic speech recognition applications. In the past, one approach has been to include essentially millions of names within the grammar. This solution has broad coverage but limited accuracy, because many names that are not employees can be recognized. A more common approach is to limit the names in the grammar to current employees. This method has a higher accuracy with automatic speech recognition but is costly to maintain because additions to this type of recognizer grammar require recompiling the entire grammar. Accordingly, using the principles disclosed herein grammar builds can be done much less frequently and with fewer names and recent additions can still be recognized by the application. One aspect disclosed herein is a solution to the problem by partitioning the name recognition problem into two parts. In the first part, as it is typically done, the caller speaks a name and the acoustic representation of the spoken name is compared to a precompiled grammar of employee names. If the database relates to the some other data such as places or products or any other kind of data the received speech input is compared to a precompiled grammar associated with the data in the database. If a match is found above a given threshold the application proceeds normally. However, according to the principles disclosed herein, if the application returns a no match for the data such as the spoken name, or no match above a given threshold, the application will then compare the acoustic waveform to a dynamically created grammar comprised of just updated data such as names since the last time the precompiled grammar was compiled. This secondary grammar is built on the fly and dynamically by reference to a table list or database of data updates.

The work and processes involved in updating databases for an ASR grammar required by described applications are both time consuming and costly. Aside from the expense, this means that updates are done less frequently. Using the principles disclosed herein, updates are cheaper, faster and can be done more frequently. The small grammars contain only additions since deletions and changes are transparent from the application standpoint, and can be modified quite often without developmental processes.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the principles here could apply to any spoken dialog system in any context. Furthermore, the precompiled database may be focused on any type of data. Names are mentioned above as a preferred embodiment because of the dynamic nature of directory databases, but the database may comprise addresses, classes, any geographic name or description, physical attributes, historical data, etc. Thus while there may be preferred types of databases, such as name directories, the principles of the invention may apply to any database. Accordingly, the appended claims and their legal equivalents should only define the invention, rather than any specific examples given.

We claim:

1. A method comprising:
   comparing, via a processor, received speech with a precompiled grammar to yield a match result, wherein the precompiled grammar is based on a database;
   when the match result is above a threshold, returning a result based on matching data; and
   when the match result is below the threshold, comparing the received speech with a dynamically compiled grammar that is based only on new data added to the database after the precompiled grammar is compiled.

2. The method of claim 1, wherein the dynamically compiled grammar is separate from the precompiled grammar.

3. The method of claim 1, wherein the new data is obtained from at least one of: a table, a list, and an update database.

4. The method of claim 1, wherein the database comprises a directory of names.

5. The method of claim 1, further comprising dynamically compiling a new grammar when the received speech does not match data in the dynamically compiled grammar.

6. The method of claim 5, wherein the new grammar comprises updated data from the database.

7. The method of claim 1, wherein the received speech comprises an acoustic representation of a spoken name.

8. A system comprising:
   a processor; and
   a computer-readable medium having stored therein instructions which, when executed by the processor, cause the processor to perform a method comprising:
      comparing received speech with a precompiled grammar to yield a match result, wherein the precompiled grammar is based on a database;
      when the match result is above a threshold, returning a result based on matching data; and
      when the match result is below the threshold, comparing the received speech with a dynamically compiled grammar that is based only on new data added to the database after the precompiled grammar is compiled.

9. The system of claim 8, wherein the dynamically compiled grammar is separate from the precompiled grammar.

10. The system of claim 8, wherein the database comprises a directory of names.

11. The system of claim 8, wherein the new data is obtained from at least one of: a table, a list, and an update database.

12. The system of claim 8, the computer-readable medium storing instructions which, when executed by the processor, cause the processor to perform a method further comprising dynamically compiling a new grammar when the received speech does not match data in the dynamically compiled grammar.

13. The system of claim 12, wherein the new grammar comprises updated data from the database.

14. A non-transitory computer-readable medium having stored therein instructions which, when executed by a processor, cause the processor to perform a method comprising:
   comparing received speech with a precompiled grammar to yield a match result, wherein the precompiled grammar is based on a database;
   when the match result is above a threshold, returning a result based on matching data; and when the match result is below the threshold, comparing the received speech with a dynamically compiled grammar that is based only on new data added to the database after the precompiled grammar is compiled.

15. The non-transitory computer-readable medium of claim 14, wherein the dynamically compiled grammar is separate from the precompiled grammar.

16. The non-transitory computer-readable medium of claim 14, wherein the database comprises a directory of names.

17. The non-transitory computer-readable medium of claim 14, wherein the new data is obtained from at least one of: a table, a list, and an update database.

18. The non-transitory computer-readable medium of claim 14, the instructions which, when executed by the processor, cause the processor to perform a method further comprising dynamically compiling a new grammar when the received speech does not match data in the dynamically compiled grammar.

19. The non-transitory computer-readable medium of claim 14, wherein the new grammar comprises updated data from the database.

20. The non-transitory computer-readable medium of claim 14, wherein the received speech comprises an acoustic representation of a spoken name.

* * * * *